United States Patent [19]

Steury et al.

[11] Patent Number: 5,951,096
[45] Date of Patent: Sep. 14, 1999

[54] TRAILER TOP LIFT

[76] Inventors: Virgil H. Steury, 213 Egbert Rd.;
Edwin J. Steury, 19623 Heritage Way, both of Goshen, Ind. 46526

[21] Appl. No.: 08/940,139

[22] Filed: Sep. 29, 1997

[51] Int. Cl.$^6$ .................................................. B60P 3/355
[52] U.S. Cl. .......................... 296/171; 296/173; 296/175; 296/26.05
[58] Field of Search .................................. 296/171, 173, 296/175, 176, 172, 165, 26.05, 26.04, 226.02

[56] References Cited

U.S. PATENT DOCUMENTS

| | | | |
|---|---|---|---|
| 3,325,206 | 6/1967 | Carlson . | |
| 3,508,782 | 4/1970 | Hostetler et al. | 296/27 |
| 3,674,305 | 7/1972 | Steury | 296/27 |
| 3,749,439 | 7/1973 | Ferguson | 296/26 |
| 3,981,529 | 9/1976 | Bontrager | 296/23 |
| 4,171,843 | 10/1979 | Steury | 296/27 |
| 5,704,677 | 1/1998 | Steury et al. . | |
| 5,769,485 | 8/1996 | Bontrager et al. . | |

*Primary Examiner*—Joseph D. Pape
*Assistant Examiner*—Lori L. Coletta
*Attorney, Agent, or Firm*—Trexler, Bushnell, Giangiorgi & Blackstone, Ltd.

[57] ABSTRACT

A lift for a top of a travel trailer includes flexible push-pull elements extending from a centrally mounted actuator unit thorough flexible and bendable guide conduits to outer end fittings adjacent corner jacks for raising and lowering the top. The guide conduits are connected to L-shaped guide members of outer end fittings disposed in alignment with the jacks. The L-shaped members are mounted for swivelling movement around vertical legs thereof to facilitate alignment with the flexible guide conduits and assembly of the parts.

9 Claims, 3 Drawing Sheets

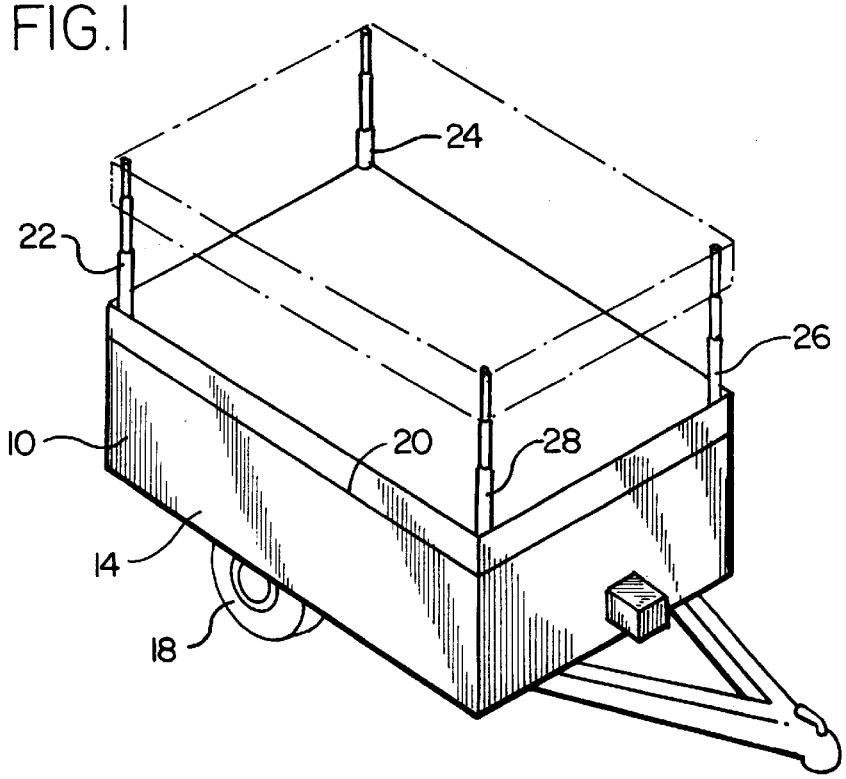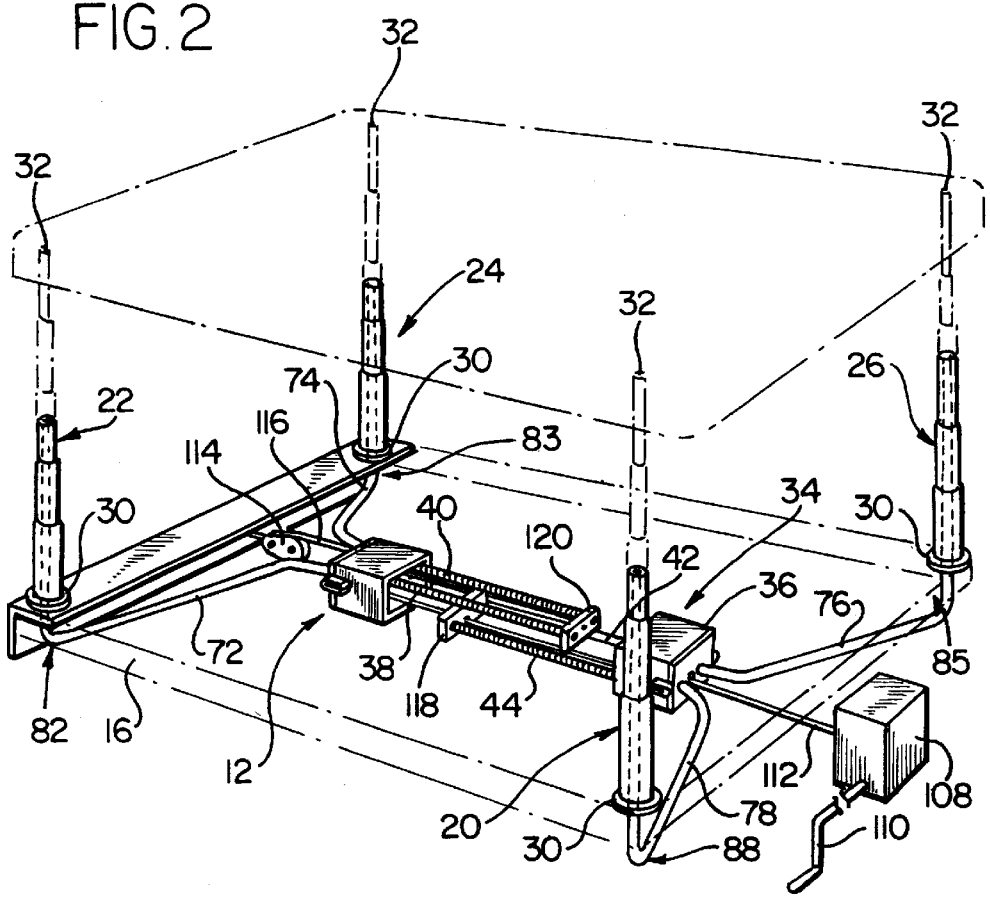

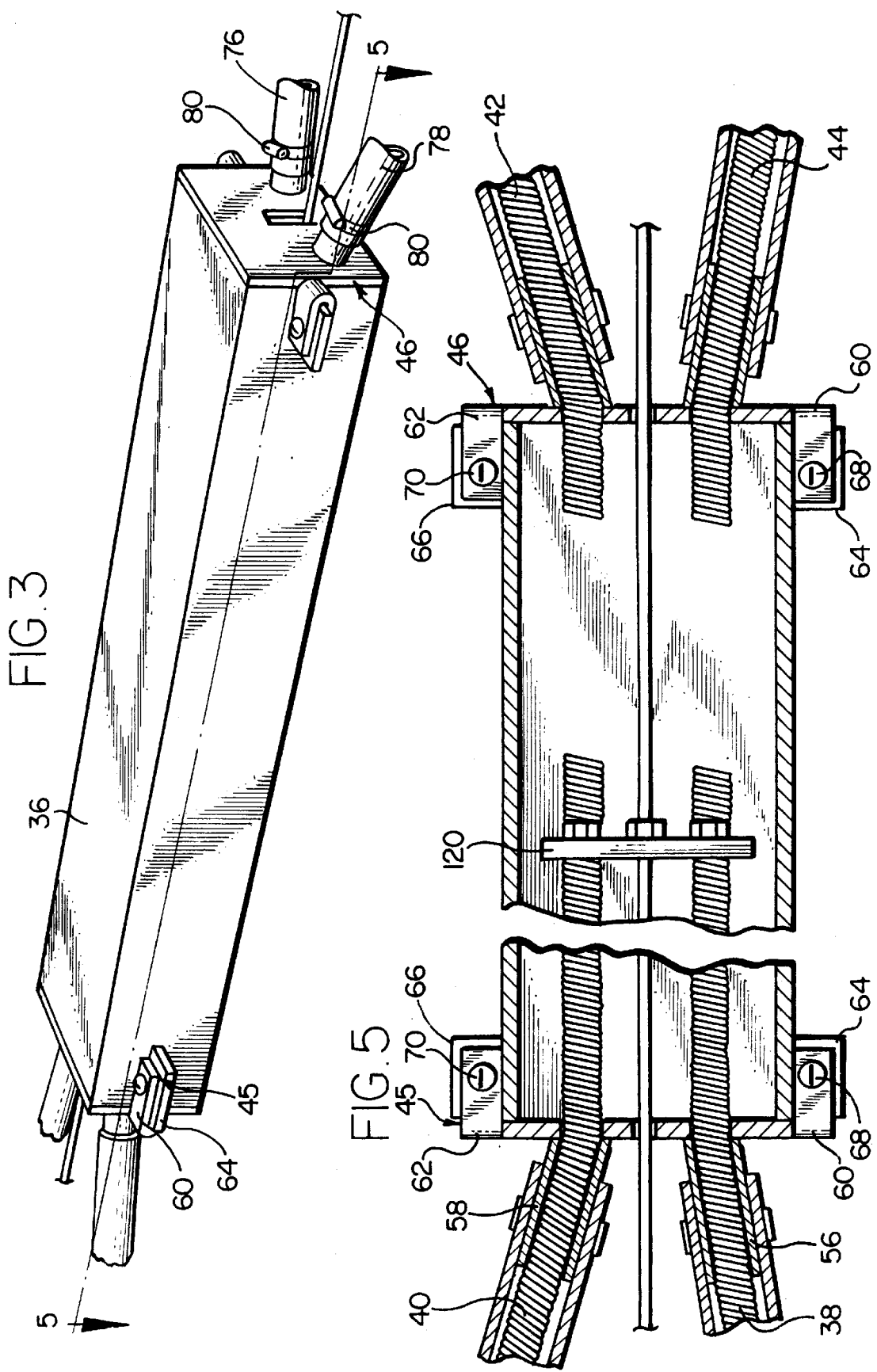

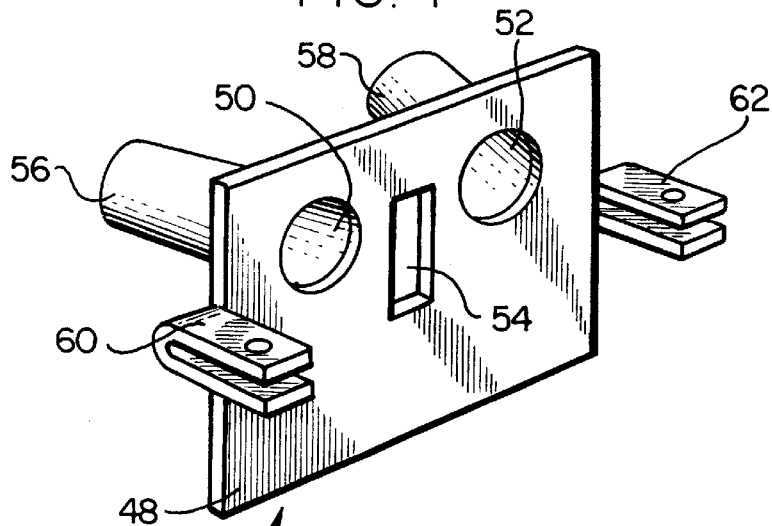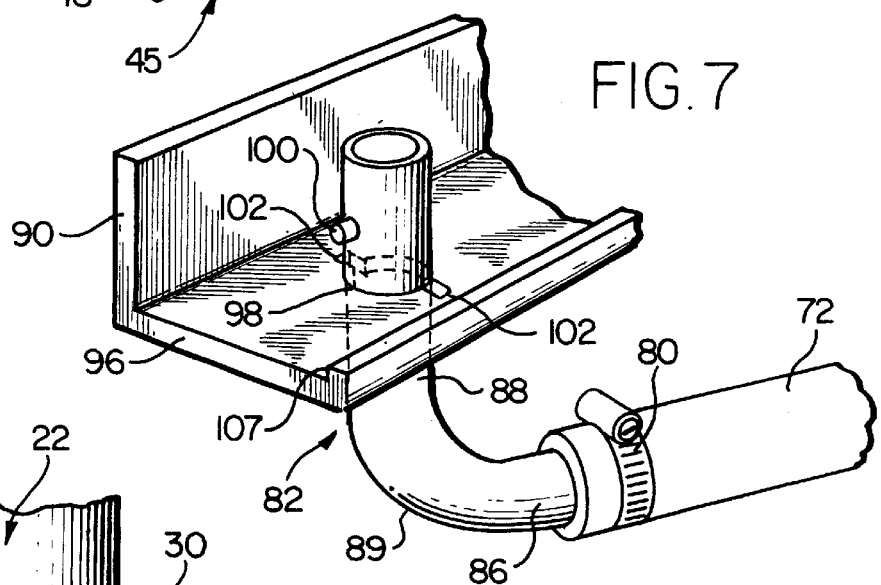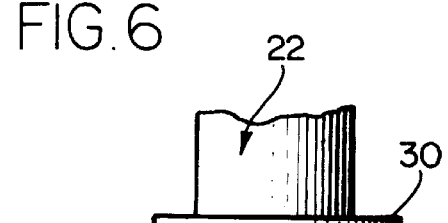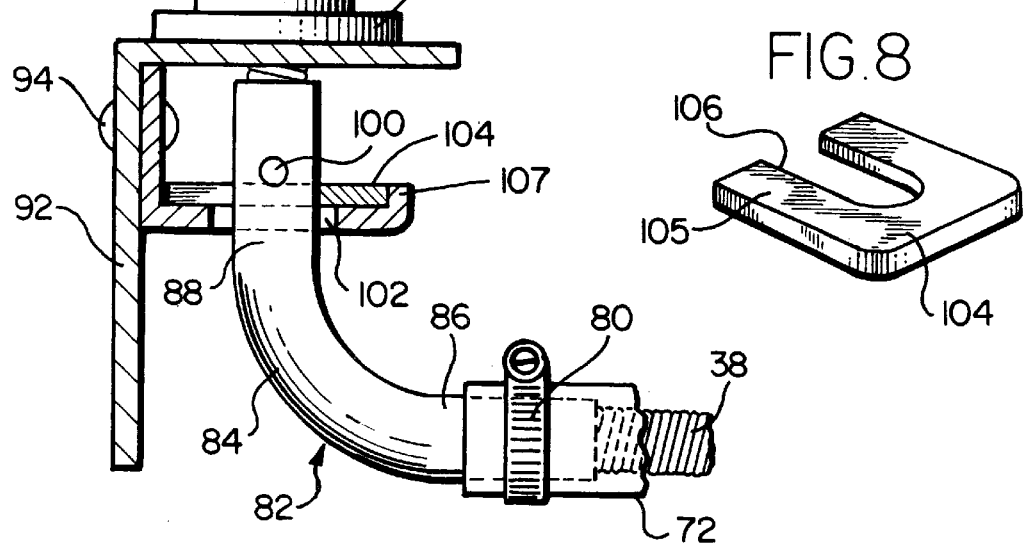

TRAILER TOP LIFT

The present invention relates to a novel lift and more particularly to a novel lift especially useful for raising and lowering tops of travel trailers and the like.

BACKGROUND OF THE INVENTION

Travel trailers and other mobile housings have heretofore been provided with colapsible tops that can be moved between raised and lowered positions. Various lift mechanisms have been installed to raise and lower the top. Such mechanisms have generally included a collapsible standard or jack at each of the four corners of the top and means for simultaneously actuating the jacks. Such prior mechanisms are disclosed in Steury patent No. 3,674,305, and U.S. application Ser. No. 609,780, filed Mar. 1, 1996, by the present inventors. In each of these prior mechanisms, a central actuator is connected to the corner jacks by flexible incompressible springs guided through inflexible and ridged steel conduits or tubes having one end ridgedly fixed to the central actuator and the opposite end ridgedly fixed to the frame of the trailer adjacent the jack to be actated. There are many different trailer manufacturers and each manufacturer has at least several different models with each such model requiring guide tubes of different lengths and different shapes. This necessitates maintaining an extensive and expensive inventory of different parts. Furthermore, because of different trailer frame constructions, difficulties are sometimes encountered in assembling and fitting the guide tubes between the actuator and the corner jacks.

OBJECTS AND SUMMARY OF THE INVENTION

It is an object of the present invention to provide a novel lift for a travel trailer top or other mobile housings, which lift is constructed so as to be substantially adapted to fit in a wide variety of makes and models of travel trailers and the like.

A more specific object of the present invention is to provide a novel lift of the above described type which is constructed so as to reduce or minimize the number of different parts while adapting the lift for installation in many different makes and models of travel trailers and the like.

Still another object of the present invention is to provide a novel lift of the above described type which may be installed easily and economically.

A further object of the present invention is to provide a novel lift of the above described type which may be retrofitted into existing trailers.

In accordance with the invention, a lift having flexible pusher elements extending from an actuator to corner jacks is provided with guide conduits which are sufficiently flexible so that they may be easily manually bent as necessary during installation and cut to the desired length so as to eliminate the necessity to provide many different pre-bent guide conduits or tubes. In addition, novel fittings are included to promote easy connection of the guide conduits to the actuator and other novel swivel fittings are mounted adjacent each of the jacks or extendable standards to enable connection with the guide conduits extending at a wide variety of angles.

Other and more specific objects and advantages of the present invention will become apparent from the following description and the accompanying drawings.

BRIEF DESCRIPTION OF THE DRAWINGS

FIG. 1 is a simplified perspective view of a travel trailer incorporating the present invention;

FIG. 2 is a perspective view of a lift mechanism incorporating features of the present invention;

FIG. 3 is an enlarged fragmentary perspective view of an actuator unit incorporating features of the present invention;

FIG. 4 is a perspective view of an end fitting used in the unit shown in FIG. 3;

FIG. 5 is an enlarged fragmentary partial sectional view taken along line 5—5 in FIG. 3;

FIG. 6 is an enlarged fragmentary partial sectional view taken along line 6—6 in FIG. 2;

FIG. 7 is a fragmentary perspective view of a portion of the structure shown in FIG. 6; and FIG. 8 is a perspective view of a locking element used in the end fitting assembly shown in FIG. 6.

DESCRIPTION OF A PREFERRED EMBODIMENT

Referring now more specifically to the drawings wherein like parts are designated by the same numerals throughout the various figures, a mobile housing such as a travel trailer 10 is shown in FIG. 1, which trailer includes a lift mechanism 12 incorporating the present invention and shown somewhat schematically in FIG. 2. In the embodiment shown, the trailer 10 comprises a body 14 supported on a rectangular frame 16 which, in turn, is mounted on wheels 18. The trailer also has atop 20 which may be moved between a lowered or closed position shown in solid lines in FIG. 1 and a raised or open position shown in broken lines in FIG. 1. The lift mechanism 12 is connected with the top in order to raise and lower it in the manner described below.

The lift 12 includes a plurality of extendable and collapsible standards or jacks 22, 24, 26 and 28 respectively located at each of four corners of the trailer body. Each of the jacks comprises a plurality of telescoping sections with lower end sections mounted to the frame or floor of the trailer as at 30 in FIG. 2 and upper end sections connected to the top as at 32 in FIG. 2.

The lift has an actuator unit 34 with a main guide tube 36 preferably mounted generally centrally beneath the floor of the trailer as shown in FIG. 2. Flexible and incompressible push-pull elements or springs 38 and 40 extend from within the tube 36 to the jacks 22 and 24 respectively. Additional such push-pull elements or springs 42 and 44 extend from the tube 36 to the jacks 26 and 28 respectively. The springs are actuated in the manner described below for raising and lowering the top 20. In accordance with the present invention, flexible and adjustable guide means are provided for directing and supporting each of the springs or push-pull elements 38, 40, 42 and 42. This guide means comprises first end fittings 45 and 46 respectively fixed to opposite ends of the tube 36. These fittings are identical except that they are disposed upside down with respect to each other so that only the fitting 45 will be described in detail and identical reference numerals are applied to identical parts of the fitting 46.

As shown best in FIGS. 4 and 5, the end fitting 45 has a base plate 48 of a size and shape to cover an end of the tube 36. The plate or base 48 is provided with a pair of spaced apart openings 50 and 52 to permit the passage of the springs 38 and 40 therethrough. In addition, a slot 54 is formed in the plate 48 for the purpose described below. Short guide tubes or nipples 56 and 58 are welded or otherwise fixed to the base plate 48 in alignment with the holes 50 and 52. The nipples 56 and 58 are constructed so as to diverge from each other generally toward the opposite corners of the trailer for the purpose described below.

In order to secure the fitting 45 to the end of the tube 36, brackets 60 and 62 are welded or otherwise fixed to opposite margins of the base plate 48. In the embodiment shown, the brackets are U-shaped and have opposed legs adapted to embrace ears 64 and 66 fixed or welded to and extending from opposite sides of the tube 36. Bolts or other suitable fasteners 68 and 70 extend through aligned apertures in the ears and brackets 60 and 62 for securing the end fitting 45 in place. The same means are provided for securing the end fitting 46 to the opposite end of the tube 36 as indicated by the application of duplicate reference numerals.

Flexible and bendable guide and support conduits 72, 74, 76 and 78 extend from the end fittings 45 and 46 for slidably receiving and guiding the springs 38, 40, 42 and 44 respectively from the actuator tube 36 to the four corners of the trailer. The guide conduits are constructed so that they are sufficiently bendable for enabling them to be manually bent and formed around and under whatever frame members of the trailer there may be between the tube 36 and the corner jack. Preferably, the guide conduits are formed from a tough resilient tube of plastic such as nylon, polyethylene or polyurathane. Such tubes can be easily formed and cut to the desired length during installation in the trailer. The guide conduits 72–78 or tubes are easily secured to the nipples of the end fittings 45 and 46 by any suitable means such as hose clamps 80. As indicated above, the nipples 56 and 58 are directed toward opposite corners of the trailer so as to reduce the necessity of bending the guide tubes or conduits 72–78.

The guide conduits 72, 74, 76 and 78 respectively extend from the inner end fittings 45 and 46 to outer end fitting assemblies 82, 83, 85 and 87 adjacent the corner jacks 22, 24, 26 and 28. The outer end fittings are identical so that only the fitting 82 shown best in FIGS. 6, 7 and 8 will be described in detail. The fitting or assembly 82 comprises an L-shaped ridged member 84 preferably formed from metal such as steel and having a generally horizontal leg 86 and a vertical leg 88. An outer end of the guide conduit 72 is secured to the horizontal leg 86 by a hose clamp 80.

The L-shaped fitting member 82 is mounted with respect to the trailer frame in a manner which provides vertical support for the adjacent jack, but also permits free pivotal movement about the vertical axis of the vertical leg 88. This enables the L-shaped member to be easily aligned with the guide conduit 72 without requiring any sharp or preformed bends in the conduit 72.

A bracket 90 is secured to a frame member or other part 92 of the trailer by fasteners 94, such as bolts or screws or by welding. The bracket 90 has a horizontal flange 96 having a hole 98 through which an upper end of the vertical leg 88 of the L-shaped member extends. Short pins or protuberances 100 extend from opposite sides of an upper end portion of the leg 88 for cooperating with the flange 96 and supporting the weight of the trailer top. In order to permit the leg 88 to be inserted through the hole 98, oppositely extending notches 102 are cut in opposite edges of the hole 98 to provide clearance for the pins 100 during assembly. When the parts are fully assembled, the L-shaped member is normally positioned so that its leg 86 extends generally diagonally of the trailer toward the tube 36. It is noted that the pins 100 are preferably located on the leg 88 so that they extend transversely of the trailer and perpendicularly to a line intersecting both notches 102. As shown in FIG. 7, the notches 102 are preferably arranged so that they extend parallel to the longitudinal axis of the trailer. With this arrangement, the L-shaped member may be easily assembled by turning it until the pins 100 line up with the notches and then swivelling it back for proper alignment with the conduit 72 at which time the pins 100 will prevent the leg 88 from dropping out of the hole 98.

If desired, a locking element or key 104 may be inserted for providing addtional assurance that the parts will remain locked in assembled relationship. As shown in FIGS. 6 and 8, the key 104 is U-shaped and has opposed legs 105 adapted to embrace the upper end of the leg 88 beneath the pins 100. An inner margin 106 of the key 104 is shaped so as to insure that there will always be engagement with at least one of the pins 100. The key 104 is proportioned so that it will fit snugly between the bracket wall 90 and an upturned margin 107 of the flange 96.

In order to operate the push-pull flexible elements or springs, a winch 108 having a crank handle 110 is provided on the trailer as shown in FIGS. 1 and 2. A first or lower run 112 of a winch cable extends through the slots 54 in the base plates 48 of the inner end fittings 45 and 46. The cable doubles back around a pulley 114 so that an upper run 116 extends back into the tube 36 for connection with inner ends of the push-pull elements 38 and 40. As shown in FIGS. 2 and 5, an intermediate portion of the lower cable run 112 is connected through a cross member 118 with inner ends of the springs or push-pull elements 42 and 44. The upper cable run 116 is similarly connected with the inner ends of the push-pull elements 38 and 40 through cross member 120.

The operation of the novel lift is believed to be readily apparent. In order to raise the trailer top 20, an operator merely turns the winch crank 110 in a forward direction so as to extend the springs 38, 40, 42 and 44 which, in turn, extend the jacks 22, 24, 26 and 28. The push-pull springs are effectively guided and supported against buckling so that the jacks are simultaneously and uniformly moved. When it is desired to lower the top, the operator reverses rotation of the crank 110 to pull the springs back and the weight of the top causes the jacks to collapse to their lowered position.

From the forgoing, it is seen that the present invention has provided a lift which may be readily adapted for installation in many different sizes and models of travel trailers or other mobile housings. The main actuator tube 36, the inner end fittings 45 and 46 and the outer end fittings 82, 84, 86 and 88 may be installed in almost any trailer regardless of make or model. The only adjustment that is required is to cut a section of flexible guide conduit stock material to the correct length since there will be no special pre-bending of the guide conduit prior to installation. Furthermore, installation is sufficiently simplified so that, if desired, the winch cable 112, the push-pull springs 38–44, the tube 36, the inner end fittings 45 and 46, the guide conduits 72–78 and the outer end fitting L-shaped members 88 may be pre-assembled as a package. When this is done, the L-shaped fitting members may first be connected with the bracket 90 of their associated end fitting assemblies 82, 83, 85 and 87. The actuator tube 36 will naturally be properly positioned centrally of the trailer where it can be secured in place.

While a preferred embodiment of the present invention has been shown and described herein, many modifications and changes may be made without departing from the spirit and scope of the appended claims.

The invention is claimed as follows:

1. A lift for raising and lowering the top of a housing, the top having a plurality of corners, said lift comprising: a plurality of collapsible jacks respectively mounted with lower ends thereof adjacent the corners and upper ends thereof engaging the top, an actuator unit including an actuator member mounted between the corners of the housing, a plurality of flexible push elements having inner ends in said actuator member, inner end fitting means fixed to said actuator member through which said inner ends of said flexible push elements respectively extend, a plurality of outer end fittings respectively mounted adjacent said jacks, each of said outer end fittings including a generally L-shaped tubular guide and support member having a vertical leg portion beneath and in operative alignment with an adjacent jack and a generally horizontal leg portion, means mounting each of said generally L-shaped tubular guide and support members for swivelling movement about a vertical axis of its respective vertical leg portion, a plurality of guide conduits respectively having inner ends connected with said inner end fitting means and outer ends connected with one of said horizontal leg portions of one of said outer end fittings, said flexible push elements extending through said guide conduits and through said generally L-shaped tubular guide and support members for operating said jacks, said swivelling movement of the generally L-shaped tubular guide and support members facilitating alignment with said guide conduits, and means engageable with said inner ends of said flexible push elements for simultaneously actuating said flexible push elements.

2. A lift for a mobile housing having a top, said lift comprising: a collapsible jack mounted on the housing and connected with the top, an actuator unit mounted on the housing and offset from said jack, a flexible push element extending from said actuator unit for actuating said jack, an outer end fitting mounted adjacent said jack, said fitting comprising a generally L-shaped member mounted for swivelling movement about a vertical leg thereof in alignment with said jack, said flexible push element extending through said generally L-shaped member for operative engagement with said jack, and a flexible guide conduit extending from said actuator unit and enclosing said flexible push element, an outer end of said guide conduit being connected to a horizontal leg of said generally L-shaped member.

3. The lift as defined in claim 2, wherein said outer end fitting comprises a bracket having a horizontal portion with a hole through which an upper end of said vertical leg freely rotatably extends, and retaining means on an upper end portion of said vertical leg cooperable with said horizontal portion for preventing withdrawal of said vertical leg from said hole.

4. The lift as defined in claim 3, wherein said retaining means comprises a protuberance extending from a side of said upper end portion of said vertical leg.

5. The lift as defined in claim 4, wherein said bracket has a slot intersecting an edge of said hole for permitting passage of said protuberance upon manual manipulation of the generally L-shaped member.

6. The lift as defined in claim 2, wherein said actuator unit comprises an actuator member, and an inner end fitting secured to an end of said actuator member, said inner end fitting including a nipple through which said flexible push element extends and said inner end fitting connected with an inner end of said flexible guide conduit.

7. A travel trailer comprising: a housing, a top, a plurality of jacks having telescoping sections respectively mounted adjacent opposite rear corners and opposite front corners of said housing for raising and lowering said top, an actuator unit including a main member mounted between said corners, a first pair of flexible push-pull elements extending rearwardly from said main member respectively toward said opposite rear corners of said housing, a second pair of flexible push-pull elements respectively extending forwardly from said main member toward said opposite front corners of said housing, a plurality of outer end fittings respectively mounted adjacent each of said front and rear corners of said housings, inner end fittings mounted at opposite ends of said main member, flexible guide conduits extending and connected to said inner and outer end fittings, said guide conduits respectively receiving and guiding one of said flexible push-pull elements, each of said outer end fittings including a generally L-shaped member having a generally horizontal leg connected with one of said flexible guide conduits and a generally vertical leg swivelly mounted in alignment with an associated jack for facilitating alignment with said one of said flexible guide conduits, and means for actuating said flexible push-pull elements in unison.

8. The travel trailer as defined in claim 7, wherein said inner end fittings respectively include diverging nipples connected with the respective flexible guide conduits for directing the respective flexible guide conduits generally toward said corners of said housing.

9. The travel trailer as defined in claim 7, wherein said flexible guide conduits are constructed from tough, resilient and bendable plastic tubing.

\* \* \* \* \*